(12) United States Patent
Hoagland et al.

(10) Patent No.: US 6,367,646 B1
(45) Date of Patent: Apr. 9, 2002

(54) BATTERY BOX

(75) Inventors: Mary M. Hoagland, Cincinnati, OH (US); Paul C. Roche, Corry, PA (US); William Knight Nook, Shaker Heights, OH (US)

(73) Assignee: Erie Plastics Corporation, Corry, PA (US)

( * ) Notice: Subject to any disclaimer, the term of this patent is extended or adjusted under 35 U.S.C. 154(b) by 0 days.

(21) Appl. No.: 09/519,033

(22) Filed: Mar. 3, 2000

(51) Int. Cl.[7] .............................................. B65D 85/00
(52) U.S. Cl. .................... 220/533; 220/367.1; 220/771; 206/703
(58) Field of Search .............................. 220/533, 367.1, 220/373, 771; 206/703

(56) References Cited

U.S. PATENT DOCUMENTS

| | | | |
|---|---|---|---|
| 4,819,795 A | * | 4/1989 | Swaney ................ 220/367.1 X |
| 5,100,015 A | * | 3/1992 | Vanderstuyf ............ 220/324 X |
| 5,641,090 A | * | 6/1997 | Kowalski et al. ........ 220/771 X |
| 5,944,211 A | * | 8/1999 | Woodnorth et al. .. 220/367.1 X |

OTHER PUBLICATIONS

Boat/US 1996 Annual Equipt. Cataloge, p. 368, 1996.*

* cited by examiner

Primary Examiner—Steven Pollard
(74) Attorney, Agent, or Firm—Webb Ziesenheim Logsdon Orkin & Hanson, P.C.

(57) ABSTRACT

A battery box for holding a single battery includes a one-piece container portion to receive a battery therein and a one-piece, vented lid releasably attached to the container portion through a latching arrangement. The container portion has a base with a raised portion for supporting the battery and at least one depression for receiving battery acid. Four walls extend from the base with opposed side walls including latching components. The lid has at least one extension spaced from an associated wall of the container portion adapted to accommodate battery cables or the like. Each lid vent includes a snap-on vent cover. A pair of handles attached to the container portion is attached to a pair of elongated ribs for distributing forces between the handle and the end wall. A pair of grooves in the base extend between opposed walls and are adapted to receive a strap therein on an exterior of the battery box and form the raised area and adjacent depressions in the interior. A plurality of ribs formed on the inside of the side walls define a plurality of positions for a movable partition within the battery box.

13 Claims, 9 Drawing Sheets

BATTERY BOX

BACKGROUND OF THE INVENTION

1. Field of the Invention

The present invention relates to a plastic container, specifically, a plastic battery box for holding a battery in operation such as in a marine environment.

2. Background Information

Containers for holding a battery, or a series of batteries, are well-known in most environments in which larger batteries are used. They are often referred to as battery packs (although a battery pack is generally the combination of the container and the batteries), battery trays or battery boxes. For example, U.S. Pat. No. 3,741,815 discloses a battery box for housing a battery for a railroad signal in the form of a vented, closed fiberglass container. Additionally, U.S. Pat. No. 4,225,655 (hereinafter "the '655 patent") discloses a battery box for use in marine environments. The watertight battery box of the '655 patent comprises an upwardly open one-piece molded plastic base and a downwardly, open one-piece molded plastic lid which rests on the upper edges of the base. One edge of the base has a recess therein for receiving the battery cables, and the lid has a downwardly opening channel therein for receiving the cables. In use, water can rise around the battery box of the '655 patent without entering the battery box because the lid traps air beneath itself, but has little or no buoyancy.

U.S. Pat. No. 4,275,131 (hereinafter "the '131 patent") discloses a battery tray which is suggested for use with vehicles in the mining environment. The '131 patent provides a metal container for a lead-acid battery having a tray for receiving at least one lead-acid battery cell therein. The tray has at least three side walls and a bottom, at least two of the side walls each having at least one cover support member extending upwardly therefrom. A cover is provided comprising a planar lid having a downwardly depending flange along at least a portion of the perimeter thereof, whereby the flange extends downwardly over the cover support members along at least a portion of each of at least two sides of the tray. The '131 patent also provides for spacing the flange from the side walls.

U.S. Pat. No. 5,004,129 (hereinafter "the '129 patent") is described as relating to containers constructed with vents which allow release of pressure from inside the container, and more particularly, to battery boxes which are self-venting. The '129 patent describes a self-venting container that includes a top section and a bottom section. The top and bottom sections have adjoining side walls. The side walls are formed of a material, such as an organic thermoplastic resin, which exhibits a predetermined elongation percentage and has a configuration which permits a cantilever-type movement of the side walls when the walls are subjected to excessive pressure on their interior surfaces.

U.S. Pat. No. 5,439,761 discloses a battery box specifically for a search light, wherein the battery box includes a rectangular box body to hold a battery, and a rectangular top cover fastened to the box body by fasteners. The '761 patent explains that the top cover has two long side bottom edges curved outward and attached to the top of two opposite long sides of the box body, and two short side bottom edges curved inward and attached to the top of two opposite short sides of the box body. Two opposite contact metal springs on the inside are respectively connected to the two electrical input terminals of an external search light by a cord, and the contact metal springs are respectively connected to the two opposite terminals of the battery when the top cover is closed causing the search light to be electrically connected to the battery.

U.S. Pat. Nos. 5,534,364 and 5,558,949 (hereinafter "the '949 patent") disclose battery boxes particularly for electric vehicles. The '949 patent discloses a battery box for housing at least two rows of batteries having a center frame to be disposed vertically between the two rows of batteries for holding the batteries in position. The center frame is a hollow member having a substantially inverted U-shaped cross section. The battery box has an outer box bent from a flat plate into a bottomed box shape, and an inner frame formed from a flat plate and fixed to inner surfaces of front, rear, left, and right walls of the outer box, the center frame being disposed in the inner frame. The battery box further includes thermally insulating members associated with a bottom panel of the outer box, the front, rear, left, and right walls of the inner frame and the center frame.

In addition to the above-patented prior art, various commercial battery boxes have been designed. Many of these boxes are not well designed for the intended purpose, such that the lids do not always engaged the base and must be strapped shut. In a marine environment, the poor design of the commercial boxes also results in the inability of fitting the box in the limited space in many existing boats.

SUMMARY OF THE INVENTION

It is an object of the present invention to overcome the disadvantages associated with the prior art discussed above and to provide consumer pleasing features for a battery box specifically designed to accommodate certain batteries. It is another object of the present invention to design a battery box with adequate side lift handles to avoid breakage in this area. A further object is to avoid a loose-fitting lid and provide a lid with space for cables attached to the enclosed battery in the operative position. Further objects of the present invention are to minimize water ingress into the box through exposed vent holes, and to provide a box which can accommodate known sizes of batteries.

The above objects are achieved with the battery box of the present invention. The present invention includes a lower container portion sized to receive the battery classification desired. The present invention additionally includes an accompanying lid, the lid having defined front and back sides. On the front two corners of the lid, extending sections are provided to accommodate cables extending from the enclosed battery. The lid includes two latch tabs located on both of the long sides of the lid at the center thereof. The latch tabs cooperate and extend through latch bars molded onto the center outwardly facing side walls of the container portion. A curved arch is provided across the center of the lid and adapted to receive a strap to allow for securing of the battery box, via brackets, to a boat deck or the like.

There are slotted vents provided on two of the highest lid surfaces to allow for gases to escape into the atmosphere. Two vent covers are provided to minimize the ingress of water. The vent covers snap into the slotted vents, but space is provided through support ribs on the vent cover to allow for the gases to escape.

The container portion preferably has grooves across the bottom in both directions which will provide a strap-down space as well as create pockets below the battery to trap any battery acid which may escape.

Handles are provided on each end wall of the container portion to allow for easy lifting of the battery box and associated battery. Extended ribs are provided below the handles to give additional support for the handles and to transfer the forces in a more distributed fashion to the end wall of the container portion. These ribs will also act as spacers preventing stacked boxes from sticking together in a storage arrangement.

One box according to the present invention will include a partition which can be positioned in various places within the container portion so that the interior of the container portion can be specifically sized to receive a variety of batteries within a given battery classification. A plurality of retaining ribs would be incorporated into the interior side walls of the container portion to provide for the different location of the divider.

The objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
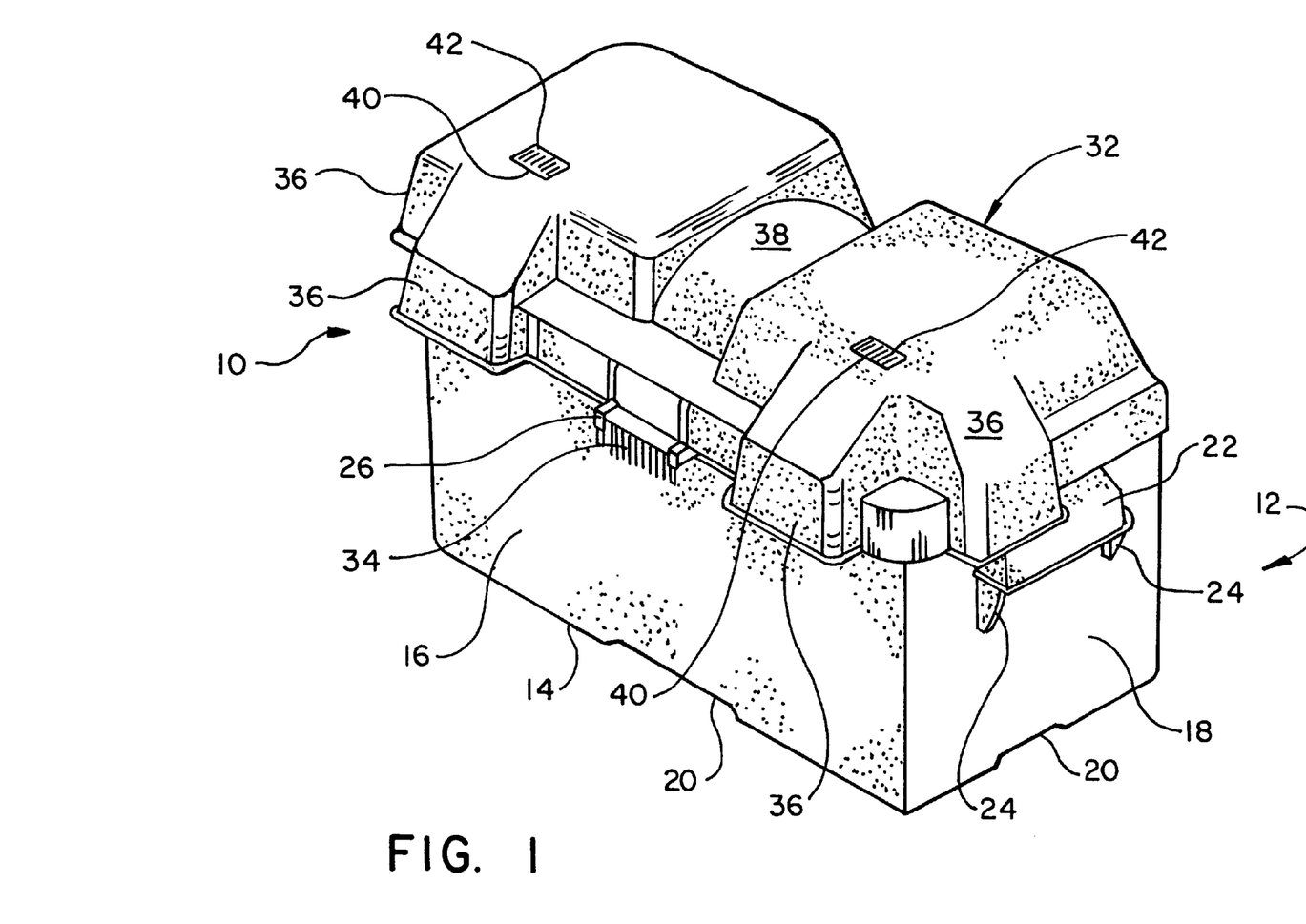
FIG. 1 is a perspective view of a battery box according to the present invention.
Figure 2:
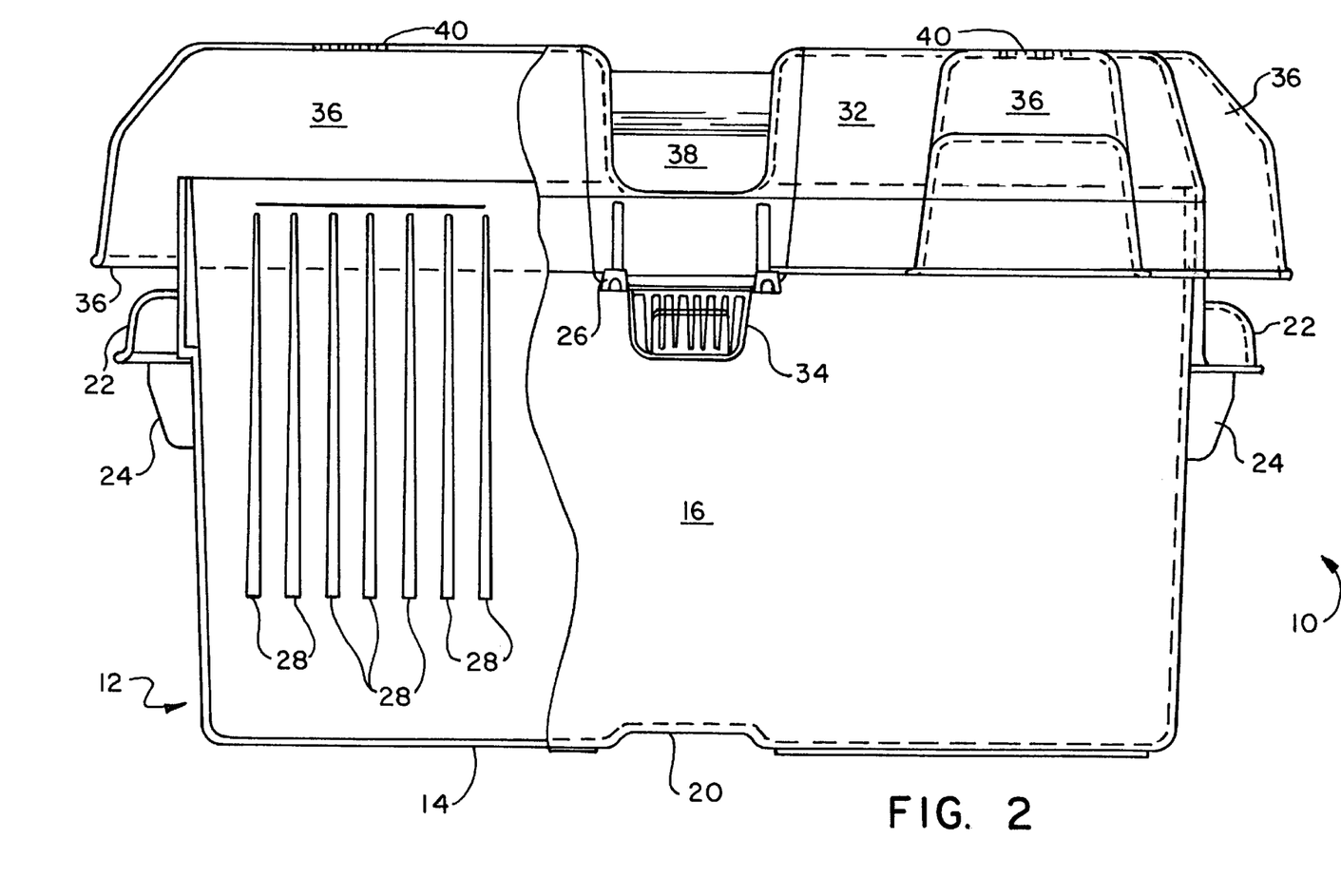
FIG. 2 is an elevational front view, partially in section, of the battery box shown in FIG. 1.

FIG. 1 illustrates a plastic battery box 10 according to the present invention. The battery box 10 includes a one-piece molded substantially rectangular-shaped container portion 12 for receiving a battery (not shown) therein. The container portion 12 includes a base 14, a pair of side walls 16 perpendicular to the base 14 on the front and rear sides of the battery box 10, and a pair of opposed end walls 18 attached to the base 14 extending substantially perpendicular thereto and extending between the side walls 16. The side walls 16, end walls 18 and base 14 form the container for receiving the battery therein.

The base 14 is formed with a pair of perpendicular grooves 20 extending between the side walls 16 and end walls 18, respectively. The grooves 20 are provided to accommodate straps on the exterior of container portion 12 without having the base 14 rest on the associated straps. Additionally, the grooves 20 form a raised battery supporting portion on the interior of the container portion 12 for supporting the battery above the adjacent depressed portions of the base 14. The adjacent depressed portions are adapted to receive any acid which may leak from the battery.

Figure 7:
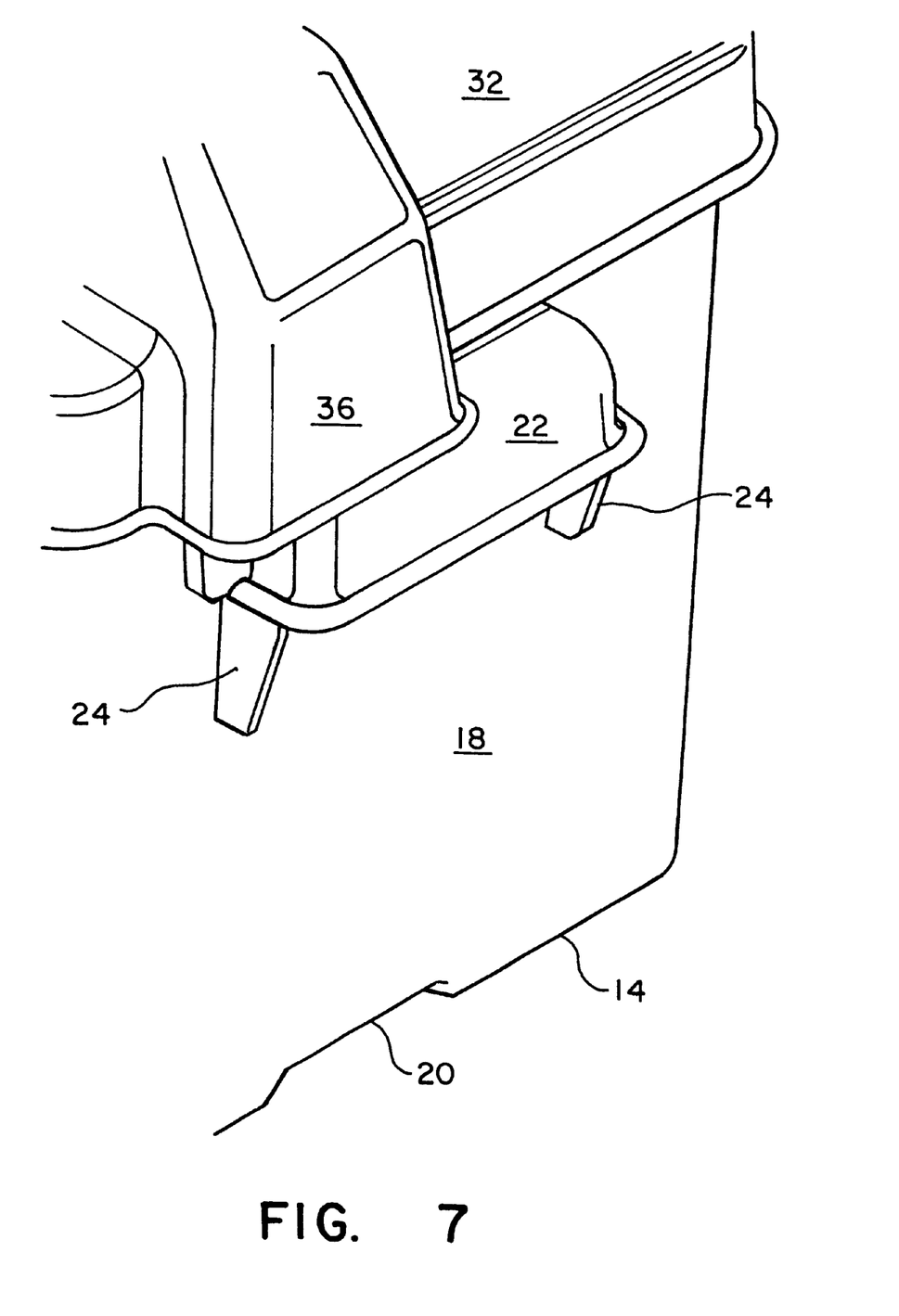
FIG. 7 is an enlarged perspective view of an end portion of the battery box shown in FIG. 1.

As shown in FIG. 7, each end wall 18 includes an integral handle 22 for griping, lifting and manipulating the associated battery box 10. The handle 22 is formed as a curved structure with a lip to provide an efficient, ergonomic handle. Additionally, integral extension ribs 24 extend down from the handle 22, further securing the handle 22 to the end wall 18. The ribs 24 are provided to help distribute the forces from the handles 22 to the end walls 18 during lifting and other manipulation of the battery box 10. Reinforcement of the handle 22 through the ribs 24 better accommodates the relatively heavy battery than previously known handle constructions. Furthermore, the ribs 24 serve to space one container portion 12 from an adjacent container portion 12 during shipping or storage of these components of battery boxes 10 according to the present invention. Essentially, the spacing provided by the ribs 24 allows stacked container portions 12 to be easily disassembled.

The base 14 additionally includes an integral latch bar 26 on each side wall 16 forming part of the latching arrangement of the battery box 10, as will be described hereinafter. The container portion 12 is designed to be substantially symmetrical about a longitudinal, vertical plane since the side walls 16 are substantially identical to each other and the end walls 18 are substantially identical to each other.

Figure 5:
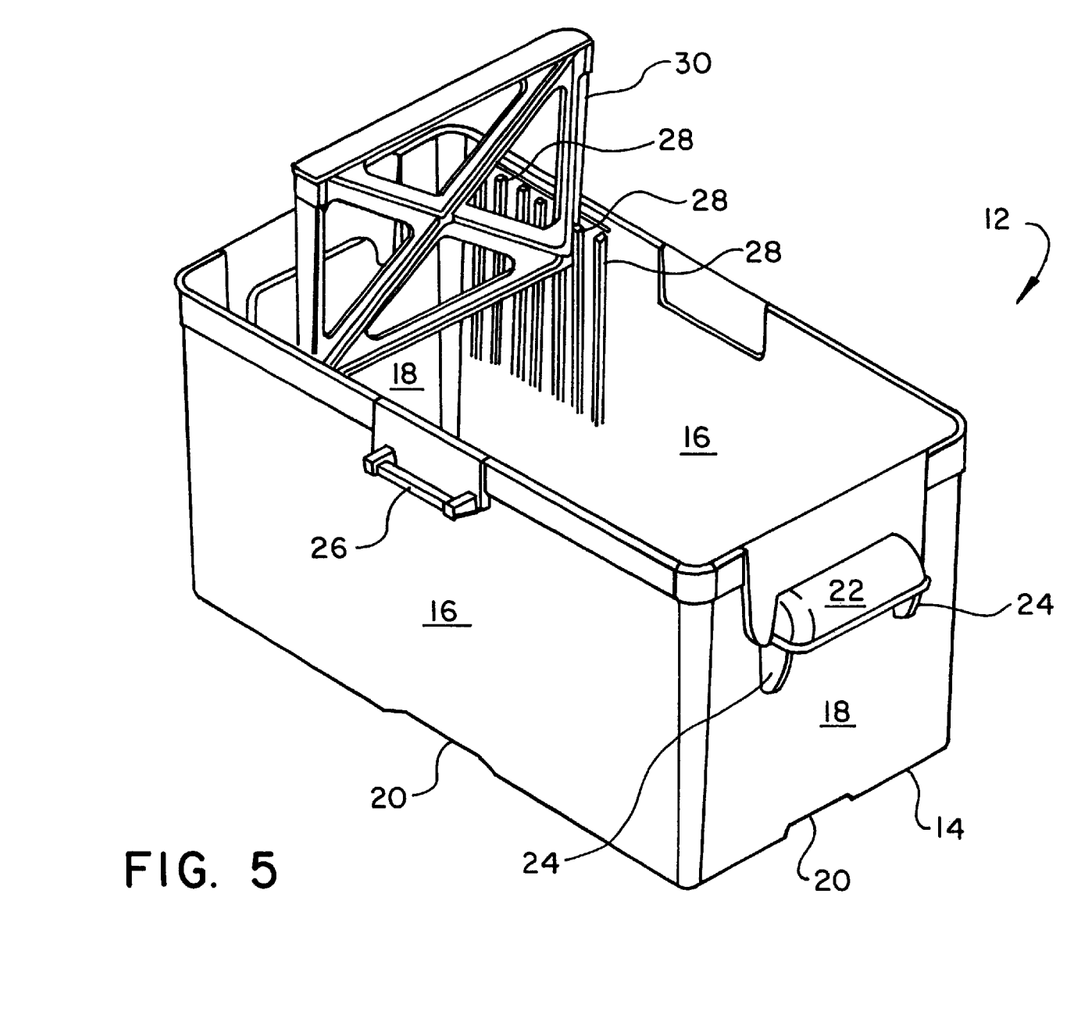
FIG. 5 is a schematic perspective view of a container and partition portion of the battery box shown in FIG. 1.
Figure 9:
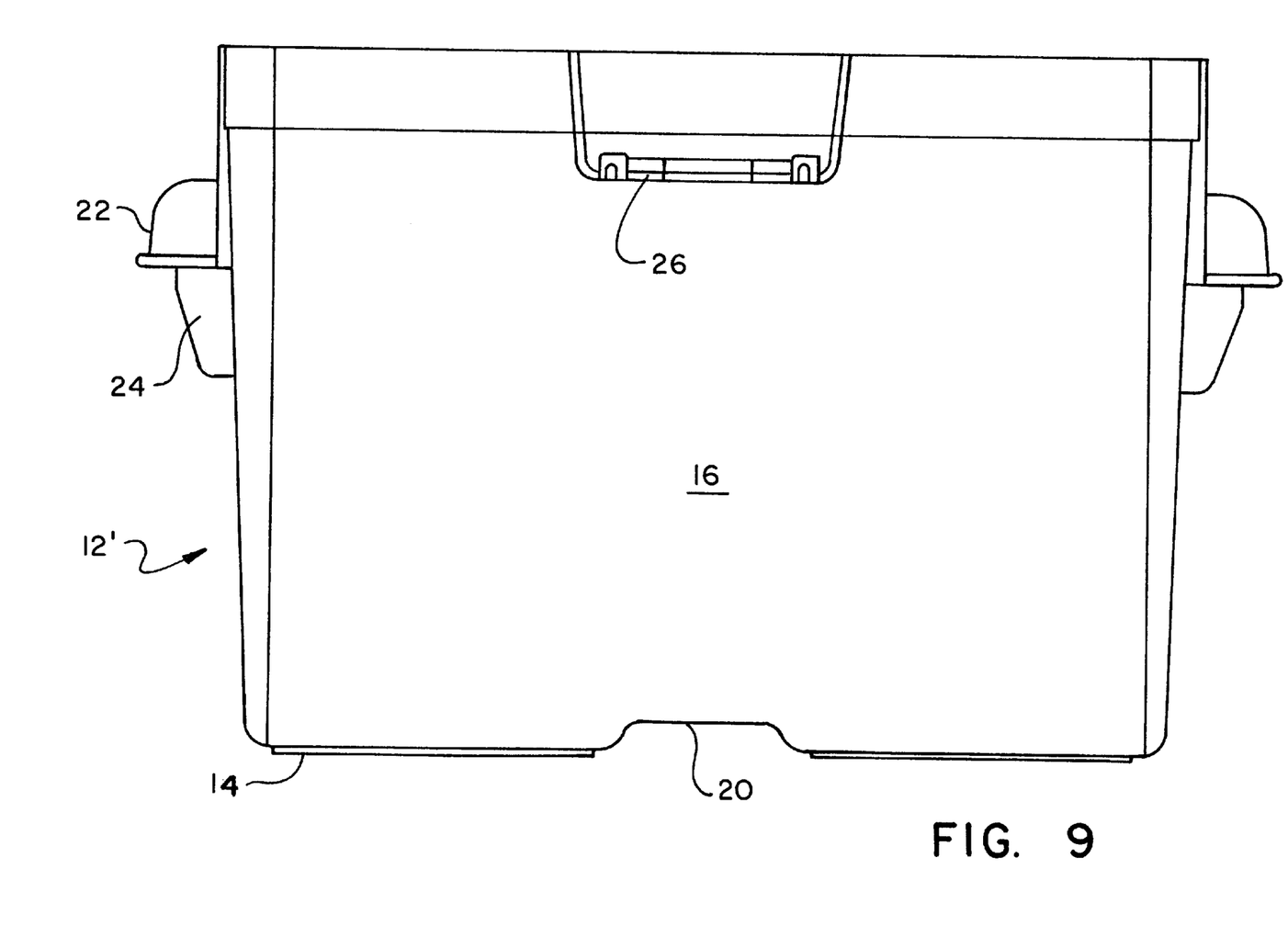
FIG. 9 is an elevational front view of a modified container portion for a battery box according to the present invention.

As best shown in FIG. 5, the container portion 12 includes a plurality of integral ribs 28 on the inside surface of the opposed side walls 16 forming a plurality of grooves for receiving a partition 30 at any one of selected locations within the container portion 12. The one-piece partition 30 is specifically sized to fit securely between adjacent ribs 28. The partition 30 allows the container 12 to be utilized for a variety of specific batteries. The partition 30 is simply adjusted to the specific battery size. Of course, if the desired battery fills up the entire interior of container 12, the partition 30 need not be inserted. An alternative embodiment of the present invention is illustrated in FIG. 9 in which a container portion 12' is manufactured without the associated ribs 28 and partition 30. In this embodiment, the container portion 12' is specifically associated with one size of battery. There are no other differences between the battery box 10 incorporating the container portion 12' rather than the container portion 12.

Figure 6:
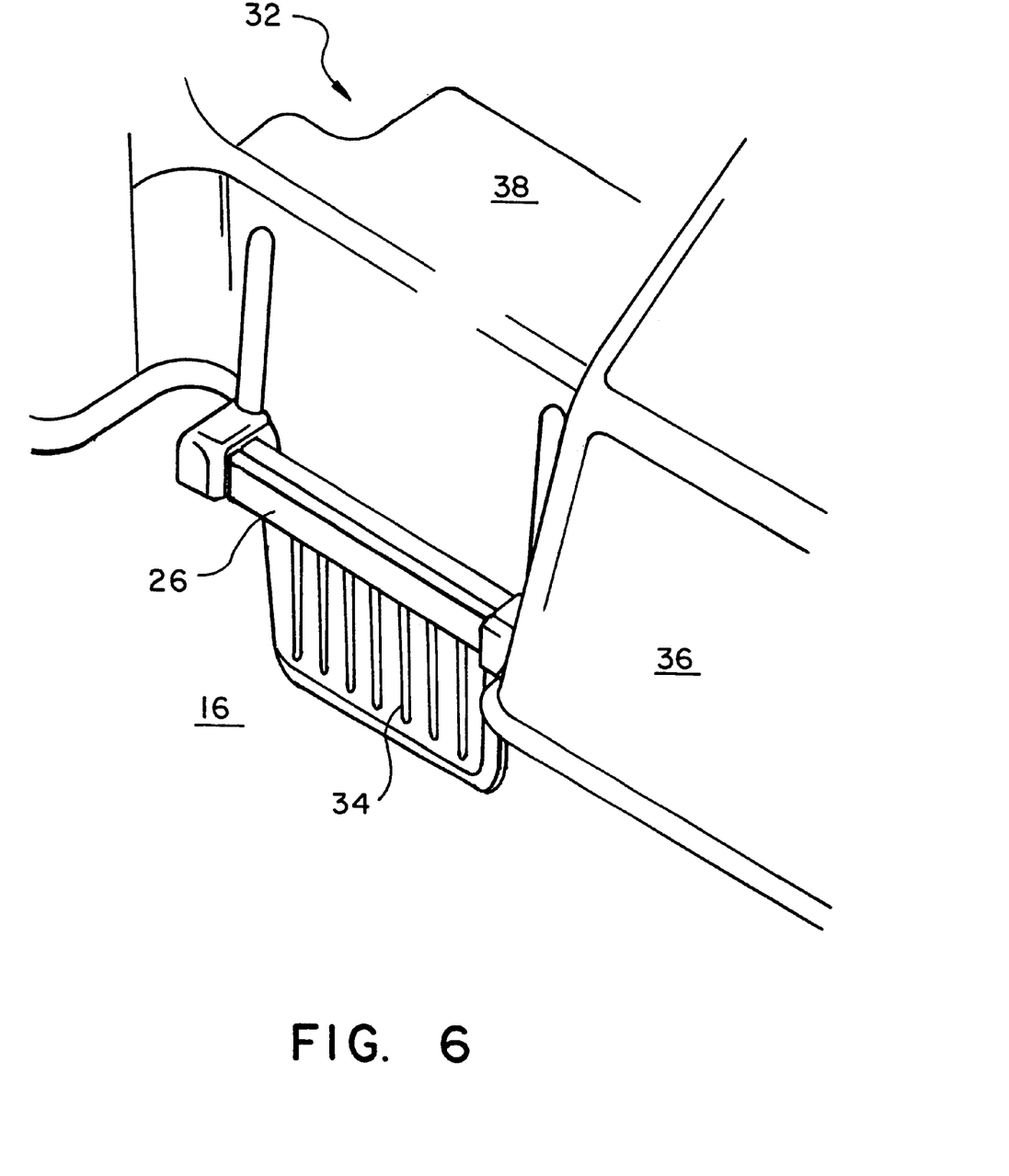
FIG. 6 is an enlarged perspective view of a lid latching arrangement of the battery box shown in FIG. 1.

The battery box 10 additionally utilizes a lid 32 engaged and attached to the container portion 12 through a specific latching arrangement shown best in FIG. 6. The lid 32 includes latch tabs 34 on forward and rearward ends of the lid 32, with each latch tab 34 adapted to cooperate and engage an associated latch bar 26 on the container portion 12. The operation of this type of latching arrangement is believed to be well-known to those in the art. The forward and rearward portions of the lid 32 are distinguished by a pair of extension portions 36 at the forward corners of the lid 32. Each extension portion 36 of the lid 32 is designed to extend from and be spaced from the edge of an associated side wall 16 or end wall 18 of the container portion 12. The extension portions 36 are designed to provide access for cables extending to the battery contained in the batter box 10. Extension portions 36 include a downwardly sloping portion extending from a top surface of the lid 32. The extension portions 36 are provided in the front corner of the lid 32, with one extension portion 36 extending beyond the associated side wall 16 and the other extension portion 36 extending over the associated end wall 18 to provide sufficient flexibility where the cables can enter.

Figure 3:
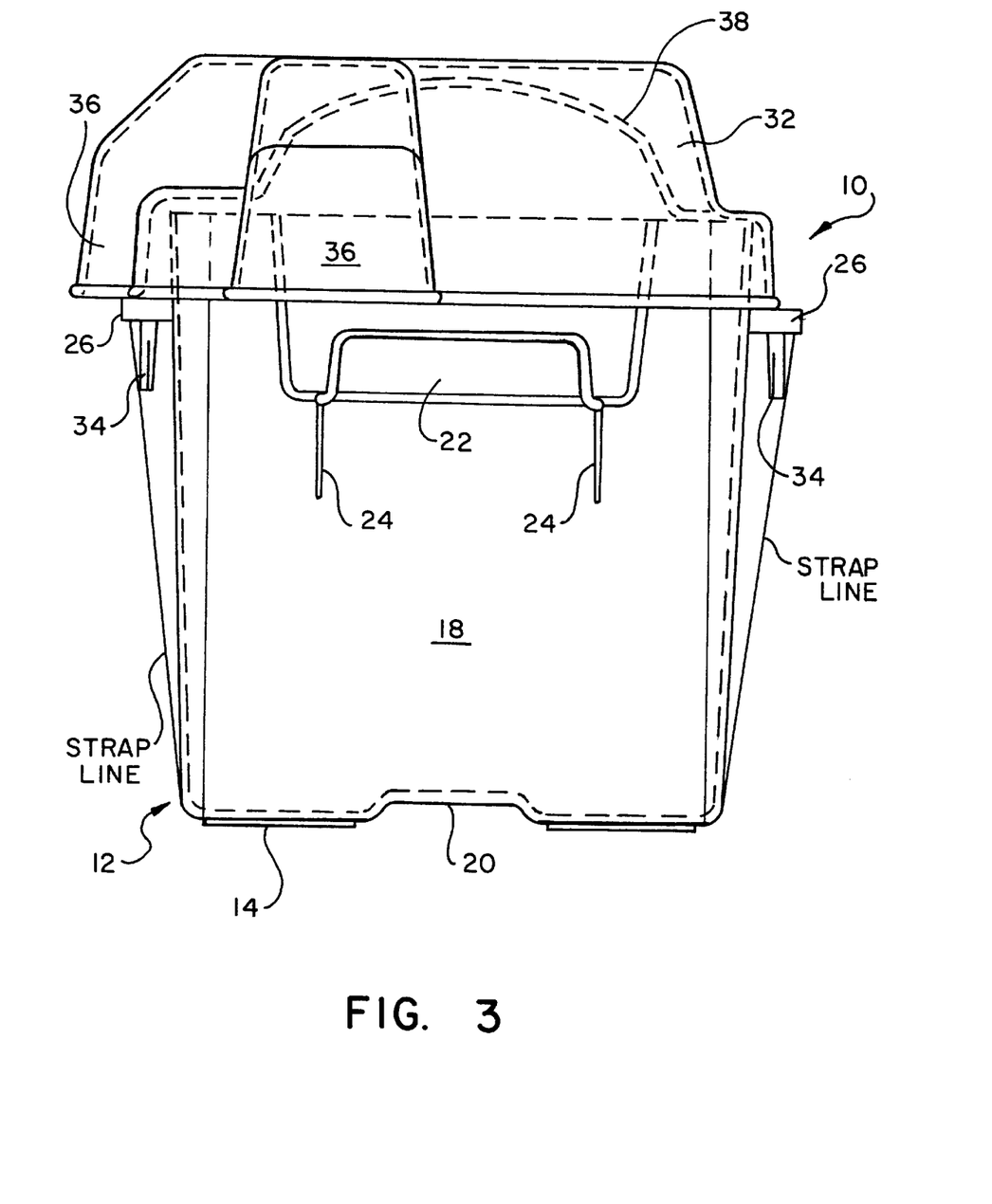
FIG. 3 is an elevational end view, partially in section, of the battery box shown in FIG. 1.
Figure 4:
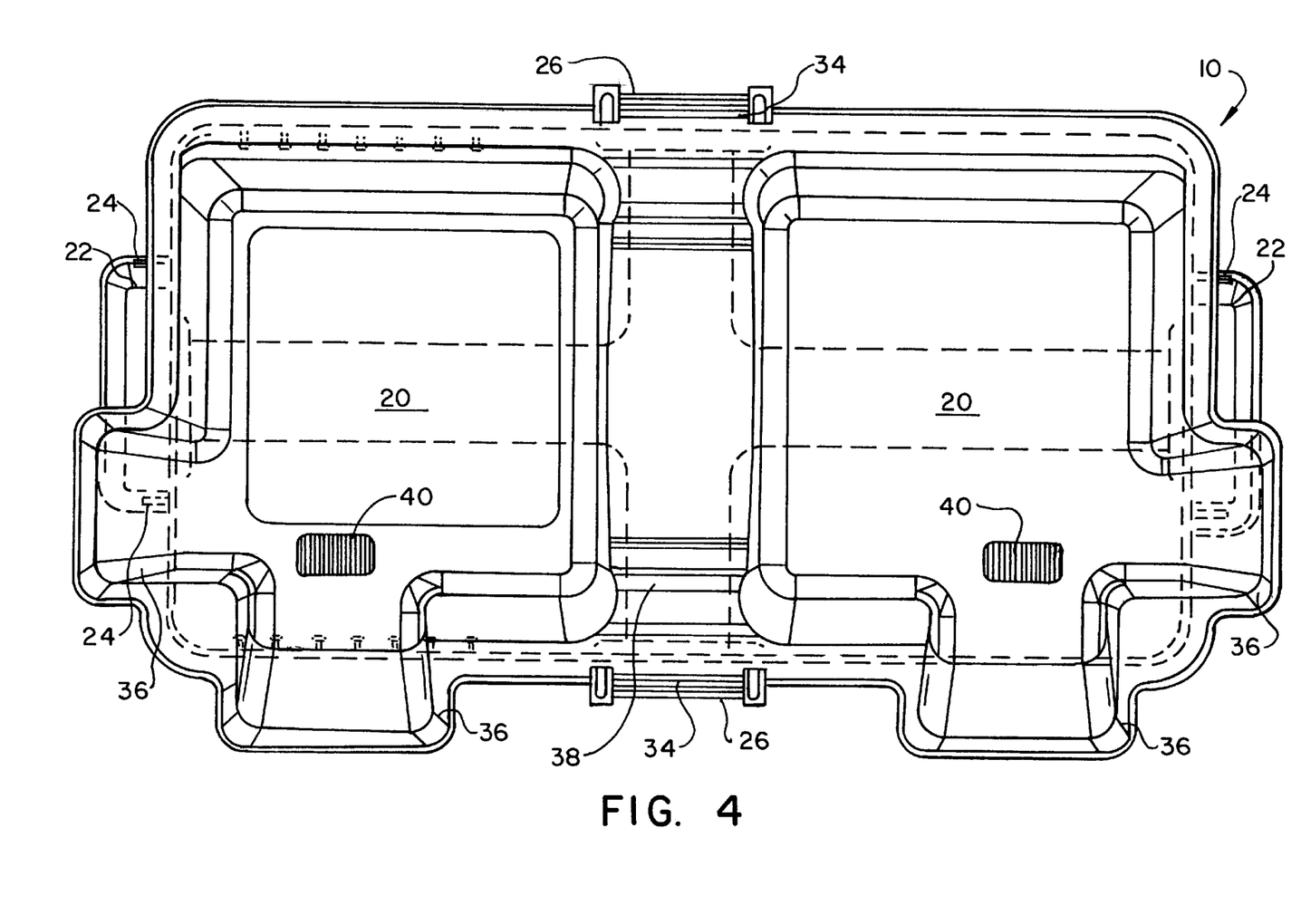
FIG. 4 is a plan view, partially in section of the battery box shown in FIG. 1.

The lid 32 additionally incorporates an arched curved portion 38 extending between the latch tabs 34. The curved portion 38 is recessed below the top surface of the lid 32 and is designed to accommodate a hold down strap for the battery box 10. As best shown in FIG. 3, the latch bar 26 of the container portion 12 is positioned such that a minimum strap line (shown in FIG. 3) does not interfere with the latch tabs 34. It will be apparent to those of ordinary skill in the art that an associated strap need not follow the illustrated strap line. The strap line illustrated in FIG. 3 is the only relevant strap which extends from the latch bar 26 to the groove 20, such as where the battery box 10 is strapped to an element not extending beyond the base 14.

Figure 8:
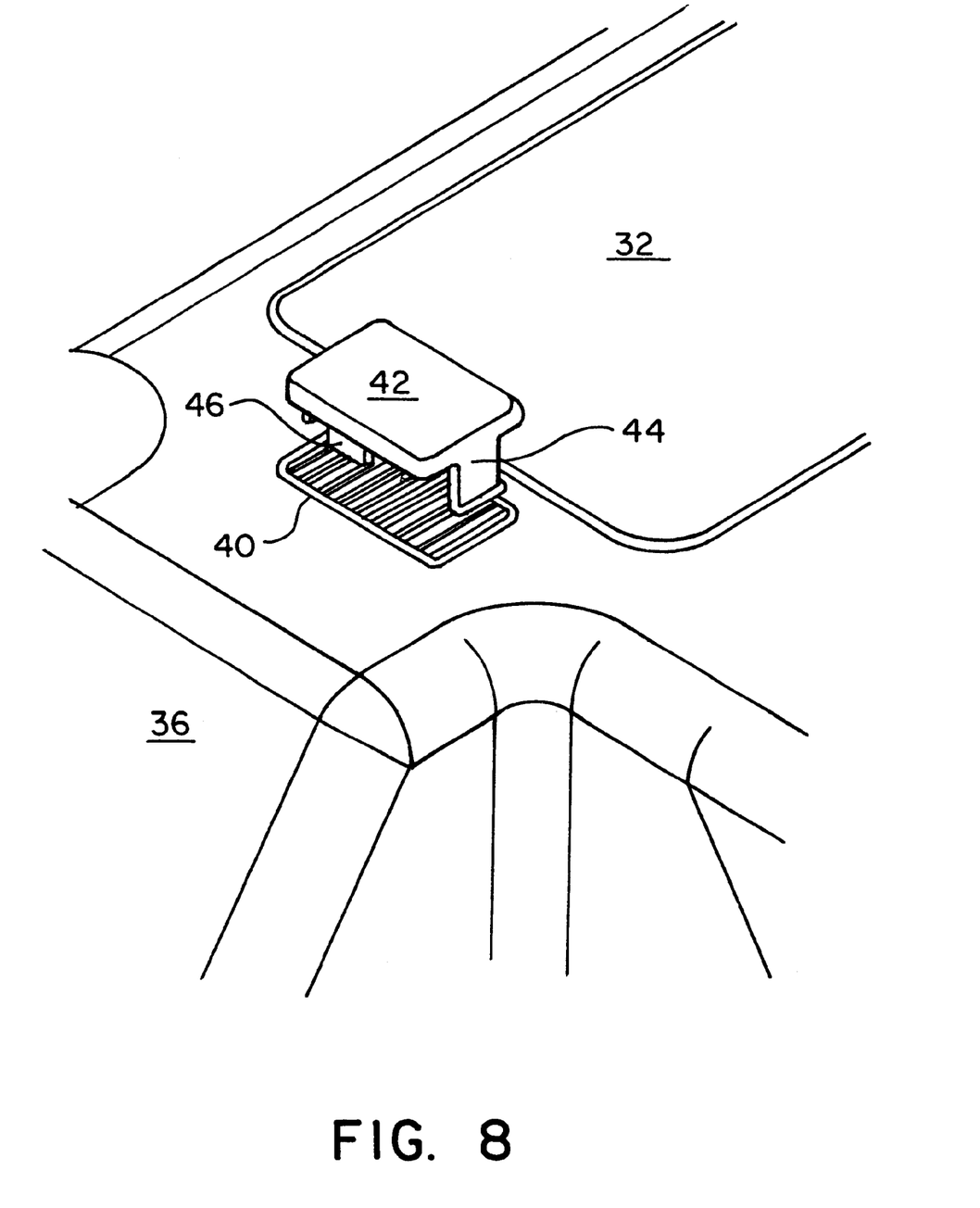
FIG. 8 is an enlarged, exploded view of a venting arrangement of the battery box shown in FIG. 1, and a transverse cross-sectional view of the battery box shown in FIG. 3.

The highest portions of the lid 32 additionally include slotted vents 40 for allowing gases to escape from the interior of the battery box 10. The vents 40 are preferably provided with vent covers 42 snapped onto the vents 40 with retaining tabs 44. Spacing ribs 46 are provided on the vent covers 42 to maintain a space between the vent cover 42 and the vent 40 to permit gases to escape. The vent cover 42 will help minimize the ingress, such as due to rain or splashing, of water or other liquids into the battery box 10.

The lid 32, with the exception of the vent covers 42, is preferably formed as a one-piece plastic molded component. The individual vent covers 42 and partition 30 are also preferably formed as one-piece plastic molded products for ease of manufacture of the various components of the battery box 10 of the present invention.

The battery box 10 of the present invention provides an efficient battery box which is durable and cost-effective to manufacture. Battery box 10 prevents water ingress by providing a lid 32 as well as vent covers 42 over the associated vents 40. The snap-on attachment of the lid 42 to the container portion 12 provides advantages over known battery boxes, particularly where the user has to carry the battery box and associated battery to and from the boat, car or the like with battery cables attached. Battery cables are stiff, and can cause the lids of conventional boxes to pop off requiring such lids to be strapped down. The snap-on feature of the present invention firmly holds the lid 32 in position during transportation of the associated battery box 10. The handles 22 of the present invention provide sturdier construction than prior art designs. The handles 22 incorporate greater finger room by rolling the lower grip edge or lip outward. The ribs 24 are believed to additionally add to the structural integrity of the battery box 10 of the present invention. The symmetrical orientation of the container portion 12 eliminates the need for a left-right orientation. Although the lid 32 includes a front-back orientation, the lid 32 can be turned around and attached to the container portion 12 at 180°, essentially reversing the forward and reverse directions of the battery box 10. The battery box 10 of the present invention additionally fits strap holders under the box through the lower grooves and across the top of the box in a convenient and efficient fashion. The grooves are designed to fit various width straps up to at least a 2 inch strap.

The preferred embodiments of the present invention which are described above are intended to be illustrative of the present invention and not restrictive thereof. Many changes may be made to the present invention without departing from the spirit and scope thereof. For example, extension portions 36 could be placed at all four corners with rearrangement of the vents 40 to make the lid 32 more symmetrical, although this change may increase cost and require additional material. Alternatively, some of the extensions 36 on the lid 32 may be eliminated. In view of the many possible changes, the scope of the present invention is intended to be defined by the appended claims and equivalents thereto.

What is claimed is:

1. A battery box comprising:
    a one-piece container portion adapted to receive a battery therein, the container portion having a base, a pair of opposed side walls extending from the base and a pair of end walls extending from the base between the side walls; and
    a one-piece lid releasably attached to the container portion through a latching arrangement, the lid having at least one extension spaced from an associated wall of the container portion adapted to accommodate battery cables, the lid further including a curved, recessed strap receiving groove recessed below a top surface of the lid extending between latching components of the lid; and
    a movable partition within the battery box, wherein the container portion includes a plurality of internal ribs formed on the inside of the side walls for defining a plurality of positions for the partition.

2. The battery box of claim 1, further including at least one vent in the lid.

3. The battery box of claim 2, further including a vent cover releasably attached to each vent.

4. The battery box of claim 1, further including a pair of handles attached to the container portion, with one handle attached to one end wall.

5. The battery box of claim 4, further including an elongated rib attached to each handle and to the associated end wall for distributing forces between the handle and the end wall.

6. The battery box of claim 1, further including at least one groove in the base, wherein the groove is adapted to receive a strap therein on an exterior of the battery box and forms adjacent depressions on the interior adapted to receive battery acid.

7. The battery box of claim 1 further including a pair of extensions in at least two corner portions of the lid.

8. The battery box of claim 7, wherein one extension of each pair extends beyond an associated side wall and the other extension of the pair extends beyond an associated end wall.

9. The battery box of claim 1, wherein the latching arrangement includes a pair of latching tabs on the lid, each of which cooperates with a latching bar on the container portion.

10. The battery box of claim 1 wherein at least four of the internal ribs are provided on one half of each side wall to provide a plurality of positions for the partition on one half of the container portion.

11. A battery box for holding a single battery, the battery box comprising:
    a one-piece container portion adapted to receive a battery therein, the container portion having a base having a raised portion for supporting the battery and at least one depression for receiving battery acid, a pair of opposed side walls extending from the base and a pair of end walls extending from the base between the side walls, each side wall including a latching component, the container portion including a plurality of internal ribs formed on the inside of the side walls, the container portion including a pair of handles attached to the container portion, with one handle attached to one end wall, and a pair of elongated external ribs attached to each handle and to the associated end wall for distributing forces between the handle and the end wall, the container portion including a pair of grooves in the base extending between opposed walls, wherein each groove is adapted to receive a strap therein on an exterior of the battery box and forms the raised area and adjacent depressions in the interior; and
    a one-piece, vented lid releasably attached to the container portion through latching components, each of which cooperates with one latching component of the container portion to form a latching arrangement, wherein the latching arrangement includes a pair of latching tabs on the lid, each of which cooperates with a latching bar on the side walls of the container portion and the battery box further including a curved, recessed strap receiving groove in the lid positioned below an upper surface of the lid and extending between the latching tabs of the lid, the lid having at least one extension spaced from an associated end wall of the container portion adapted to accommodate a battery cable and at least one extension spaced from an associated side wall of the container portion adapted to accommodate a battery cable the lid having a plurality of vents;

a one piece vent cover releasably attached to each said vent; and a movable partition within the battery box, wherein the plurality of internal ribs formed on the inside of the side walls define a plurality of positions for the partition.

12. The battery box of claim 11, further including a pair of extensions in at least two corner portions of the lid, wherein one extension of each pair extends beyond an associated side wall and the other extension of the pair extends beyond an associated end wall.

13. The battery box of claim 11 wherein at least four of the internal ribs are provided on one half of each side wall to provide a plurality of positions for the partition on one half of the container portion.

* * * * *

UNITED STATES PATENT AND TRADEMARK OFFICE
CERTIFICATE OF CORRECTION

PATENT NO. : 6,367,646 B1
DATED : April 9, 2002
INVENTOR(S) : Hoagland et al.

It is certified that error appears in the above-identified patent and that said Letters Patent is hereby corrected as shown below:

Column 6,
Line 33, "claim 7" should read -- claim 1 --.

Signed and Sealed this

Twentieth Day of May, 2003

JAMES E. ROGAN
*Director of the United States Patent and Trademark Office*